Dec. 14, 1965   H. H. WIEDER   3,223,924
HALL EFFECT STROBOSCOPE AND MAGNETOMETER
Filed Dec. 27, 1961   4 Sheets-Sheet 1

HARRY H. WIEDER
INVENTOR.

BY *J. M. St. Amand*
ATTORNEY

Dec. 14, 1965     H. H. WIEDER     3,223,924
HALL EFFECT STROBOSCOPE AND MAGNETOMETER
Filed Dec. 27, 1961     4 Sheets-Sheet 2

HARRY H. WIEDER
INVENTOR.

BY
*J. M. St. Amand*
ATTORNEY

Dec. 14, 1965  H. H. WIEDER  3,223,924
HALL EFFECT STROBOSCOPE AND MAGNETOMETER
Filed Dec. 27, 1961  4 Sheets-Sheet 4

HARRY H. WIEDER
INVENTOR.

ATTORNEY

United States Patent Office 3,223,924
Patented Dec. 14, 1965

3,223,924
HALL EFFECT STROBOSCOPE AND
MAGNETOMETER
Harry H. Wieder, Riverside, Calif., assignor to the United
States of America as represented by the Secretary of
the Navy
Filed Dec. 27, 1961, Ser. No. 162,616
4 Claims. (Cl. 324—45)
(Granted under Title 35, U.S. Code (1952), sec. 266)

The invention herein described may be manufactured and used by or for the Government of the United States of America for governmental purposes without the payment of any royalties thereon or therefor.

The present invention relates to converters based upon the Hall effect, and more particularly to magnetometers and electronic stroboscopes having superior properties as noise discriminators.

In general the invention utilizes the large Hall effect of intermetallic semiconductor films, such as indium antimonide, for constructing simple, rugged and versatile electronic stroboscopes and for determining the amplitude and frequency components of magnetic fields alternating at frequencies up to several megacycles per second. A pulsed sampling magnetometer, based on the Hall effect, is capable of recording the waveform amplitude and direction of periodic magnetic fields.

The stroboscope device of the present invention also has superior properties as a noise discriminator and will reject 60 c.p.s. noise and fluctuations in ambient magnetic fields not of the same frequency as the input signal or its harmonics. This device may be constructed to be sensitive to the direction of intermediate and high frequency magnetic fields and consequently may be used to map the magnetic field components of electromagnetic generators.

A high-frequency periodic magnetic field of arbitrary waveshape may be converted into a low-frequency replica of an input signal with the electronic stroboscope of the present invention. This is accomplished by sampling the magnetic field by means of synchronized narrow rectangular current pulses applied to a Hall plate. These current pulses are then phase modulated allowing the magnetic field to be scanned point by point thus producing an output voltage which, after integration, is a lower frequency synthesis of the input signal.

Such Hall effect stroboscopes will not respond to ambient magnetic fields, except those of the same frequency as the input signal or its harmonics and, therefore, have superior properties as noise discriminators.

It is an object of the invention, therefore, to provide a Hall effect stroboscope and noise discriminator.

Another object of the invention is to provide a sampling magnetometer, based on the Hall effect.

A further object of the invention is to provide a novel Hall effect frequency converter.

Still another object of the invention is to provide a device for periodically sampling a magnetic field in order to synthetically reproduce the periodically varying field waveform.

A still further object is to provide a means for measuring both very low magnetic fields, of the order of $10^{-2}$ gauss, as well as high magnetic fields, of the order of $10^4$ gauss, of any periodic waveform at frequencies well into the microwave region.

Another object is to provide a novel means for recording the waveform, amplitude and direction of periodic magnetic fields.

Other objects and many of the attendant advantages of this invention will become readily appreciated as the same becomes better understood by reference to the following detailed description when considered in connection with the accompanying drawings wherein.

I. *Introduction*

An electronic stroboscope is essentially a converter device wherein a high-frequency periodic signal of arbitrary waveshape may be converted at the output of the device into a low-frequency replica of its input. The conventional stroboscope used for the observation of phenomena, such as the rotation of a wheel, is well known. The wheel is illuminated by a source emitting short light pulses whose frequency is varied until the wheel appears to be standing still or moving very slowly. This occurs when the repetition rate of the light pulses is very nearly the same as the frequency of rotation of the wheel and the phase difference between them causes the pulses to sample, in sequence, different portions of the wheel's cycle of motion.

Similar stroboscopic or sampling techniques can be used in electrical and electronic circuits with the primary aim of displaying on a low-frequency device a recurrent high-frequency phenomenon.

Figure 1:
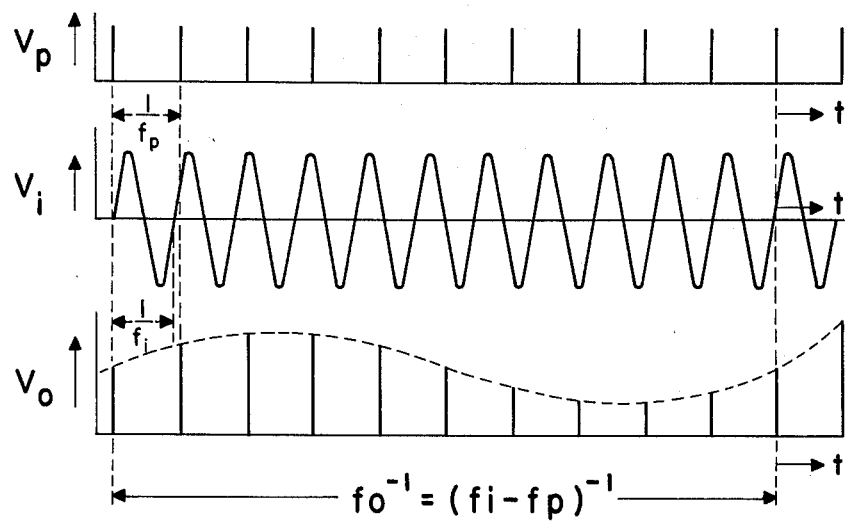
FIGURE 1 is a timing diagram showing relations between an input signal $v_i$, a strobing pulse $v_p$ aplied to a stroboscope, and the synthesized output signal $v_0$.

The principle is illustrated in FIGURE 1: A phase modulated pulse train of constant amplitude, $v_p$, and repetition rate, $f_p$, is applied at one input port of a suitable converter. A suitable frequency converter device, to be hereinafter described, should have two input ports or terminals. At the other input port, a signal is introduced of amplitude $v_i$ and frequency $f_i$. At the converter output, a signal, $v_0$, will then be obtained at a frequency, $f_0$, hence a low-frequency synthesis can be built up by integration of the discrete sampled points of $v_i$.

Figure 4:
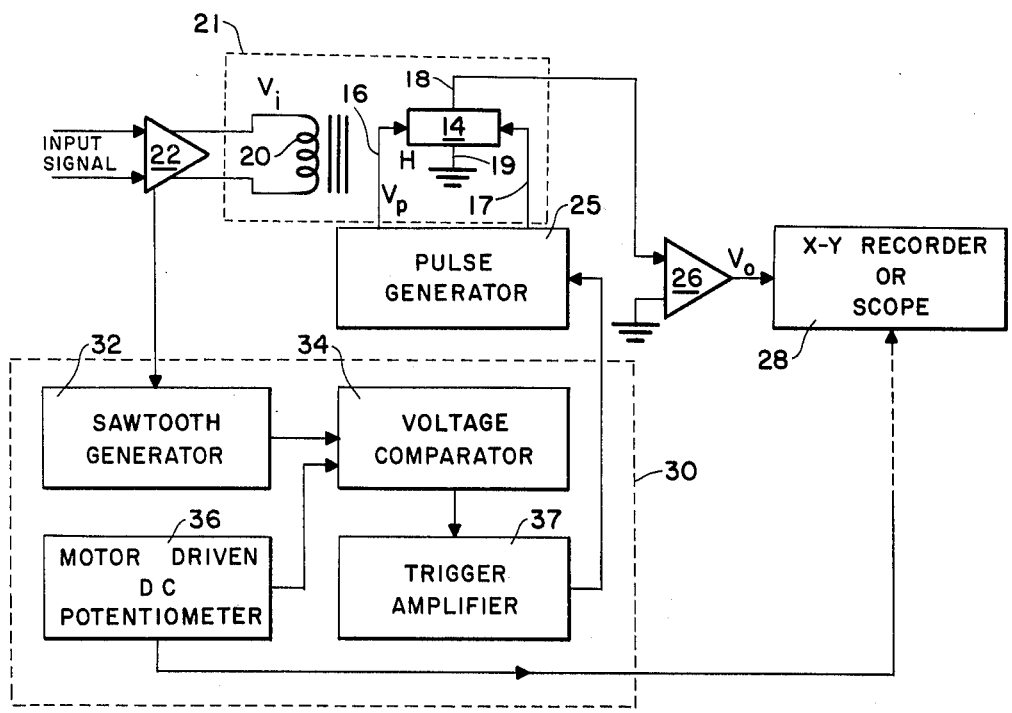
FIGURE 4 is a block diagram of a Hall effect stroboscope of the present invention.

In its simplest form, an electronic stroboscope consists of a converter, a strobe pulse generator, a low-pass integrating filter and a low frequency display device such as a recorder or oscilloscope as shown in FIGURE 4. The signal input frequency will be slowed down at the output according to the ratio $(f_0/f_i)$. If the input signal contains $m$ harmonics, then $(2m+1)$ points of a cycle are required to define it because of its Fourier components. The number of sampling pulses $n$, per output cycle is evidently $n=(f_p/f_0)$ consequently in order to display the input curve completely it is required that:

$$n=\left(\frac{f_p}{f_0}\right)\geq (2m+1) \tag{1}$$

Equation 1 sets a conditional requirement for the faithful reproduction of the input signal by means of stroboscopic techniques by setting a lower bound on the strobe pulse repetition rate. Another design limitation must be placed on the duration, $\tau$ of the strobe sampling pulses. Evidently when $f_i \cong (1/\tau)$ the width of the pulse just matches one cycle of the input signal consequently the contribution received at the output of the converter due to the positive half of the input signal is cancelled by that of the negative half. A judicious choice is imposed by the limitation that $\tau$ should not exceed the value:

$$\tau \approx \left(\frac{1}{2(f_i)}\right) \quad (2)$$

Still another design limitation is placed upon the low pass filter. The theoretical cutoff frequency, $f_c$, for the low pass filter should be $f_c \leq (f_1/2)$ in accordance with the sampling theorem as applied in other time-division systems. If, however, the reproduction of $m$ harmonics is of importance then to insure that these harmonics will be passed through the filter the cutoff frequency must be chosen so that:

$$f_c > \left(mf_o = \frac{f_i}{2}\right) \quad (3)$$

Such stroboscopes are also effective noise discriminators since by repeated sampling of a particular portion of a signal and then taking the average value of the samples, random noise variations are rejected and periodic signals, whose frequencies are not harmonically related to the input signal, can also be suppressed.

The choice of a suitable converter is of great importance in determining the operation and performance to be obtained from a stroboscope. Hall effect devices may be used as frequency converters because of their specific property as analog multipliers of two vectorial quantities. They are particularly useful if strict linearity is to be maintained between input and output over a wide range of input amplitudes and frequencies.

II. *The Hall effect*

Figure 2:
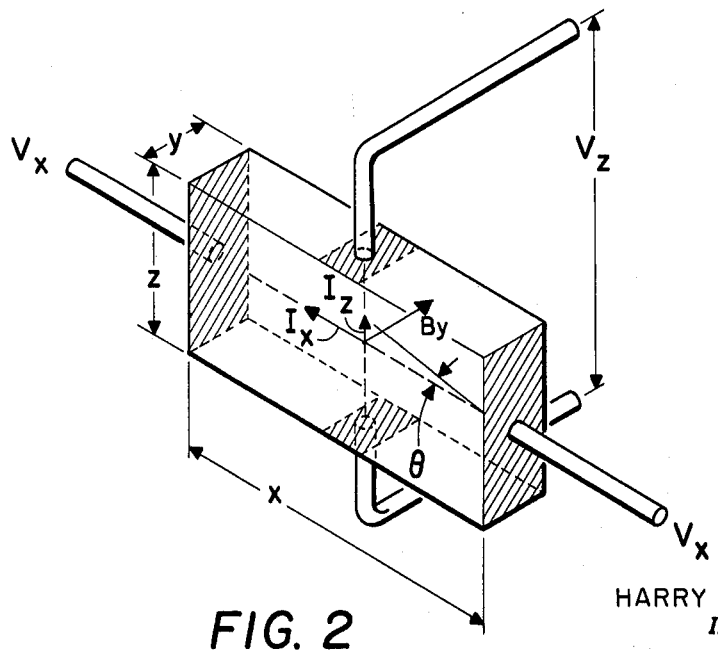
FIGURE 2 illustrates the Hall potential $V_z$ developed in a rectangular, n-type semiconductor slab because a magnetic field $B_y$ orthogonal to the electron current $I_x$ deflects the electrons through an angle $\theta$.

Let a potential $V_x$ difference be established along the plane of a current carrying plate oriented with respect to cartesian coordinates $x, y, z$ in FIGURE 2. Then an electric field $E_x$, which is the gradient of the applied potential $V_x$, will produce an electron current $I_x$, with an average velocity $v_x$. A magnetic field, orthogonal to the electric field, will produce a deflection in the path of these electrons; hence, a new current $I_z$ will arise orthogonal to both $B_y$ and $E_x$. The charges accumulating at the boundaries of the film along the $z$ axis, create an electric field $E_z$, which counteracts the original electric and magnetic forces until at equilibrium:

$$eE_z = ev_x B_y \quad (4)$$

The field $E_z$ is defined as the Hall field. It is the gradient of the Hall potential $V_z$ across the width of the film. Since $v_x = \mu E_x$ where $\mu$ is the electron mobility, and the current density $J_x = \sigma E_x$, Equation 4 may be written as:

$$V_z = \left(\frac{\mu}{\sigma}\right) z J_x B_y \quad (5)$$

For a rectangular cross-section, such as shown in FIGURE 2, $z$ is the width of the specimen. The ratio of $(\mu/\sigma)$ is a characteristics material parameter defined as its Hall coefficient, $R_h$. Equation 5 refers to a Hall voltage due to a current composed of electrons which have the same momentum and are moving through an unbounded medium. It does not take into account the statistical distribution of electron energies due to various scattering processes and may lead to a maximum error of 15% in $R_h$.

A correction term must also be introduced in Equation 5 because the Hall contacts are not idealized point-electrodes and because of the finite dimensions of the Hall plate. For a plate of rectangular cross section, $V_z = V'_z \cdot f[(x/z), \theta]$ i.e., the Hall voltage $V_z$, for a finite plate is the same as that for one of infinite extent $V'_z$ multiplied by an expression $f$, which is a function of the ratio of the plate length to its width, and of the Hall angle $\theta$ through which the electrons are deflected by the magnetic field. For $(y/z) \approx 3$ and for $\theta \to (\pi/2)$, Equation 5 is shown to be a good approximation for the Hall effect.

For a predominantly n-type material having a high ratio of electron to hole mobility, the Hall coefficient may be expressed as:

$$R_h = -\frac{1}{ne} \quad (6)$$

where $n$ is the electron density and $e$ is the charge on the electron. A high current density is obviously desirable in order to obtain the maximum Hall voltage per unit magnetic field. Since $R_h$ is, however, temperature sensitive, the peak power dissipation of the Hall plate imposes a limitation on $J_x$.

Let the primary mechanism of power dissipation be thermal transfer of heat through one face, $xz$ of the Hall plate shown in FIGURE 2. If the peak power per unit area that may be applied without materially affecting $R_h$ is $P_m$, then:

$$V_z = B_y z \left[\frac{P_m}{y} \cdot \frac{\mu}{ne}\right]^{1/2} \quad (7)$$

Equation 7 specifies that the material desired should have a high electron mobility and a low electron concentration. It states furthermore that $V_z$ is inversely proportional to the square root of the plate thickness. Thin films of the intermetallic high mobility semiconductors such as InSb or InAs represent a judicious choice for fabricating Hall effect devices. Other advantages of thin films for devices based upon the Hall effect are, an improved thermal dissipation because of the greater surface to volume ratio of the film compared to the bulk crystal, also the high input and output impedance of film type devices simplify the problem of impedance matching of such devices to auxiliary circuits.

Methods for preparing thin films of InSb employed for the construction of Hall effect stroboscopes have been described in copending patent application Serial No. 150,846 filed November 7, 1961, now Patent No. 3,137,587, for Fabrication and Use of Semiconductor Film-Type Hall Generators. In one method, polycrystalline films of InSb between 1000° A. and 5 microns thick were deposited on microscope cover slips in vacuum. The proper Hall plate contour was thereafter cut from the glass slip by an ultrasonic cutting tool.

In another method, a fragment of polycrystalline InSb is liquified by heating it on a polished ferrite slab. Thereafter it is pressed flat by means of a heated, optically flat, quartz plate. A thin InSb film of the order of 5 microns in thickness remains attached to the ferrite (but not the glass) and sections approximately 5 mm.² free of cracks may be obtained in this manner.

III. *The magnetic circuit*

The best performance of a Hall effect stroboscope may be obtained from considerations pertaining to the magnetic circuit surrounding the Hall plate:

(a) The magnetic material should have a geometry such as to provide a maximum flux density across the gap in which the Hall plate is placed, and a minimum of flux leakage.

(b) The material should have a high permeability without any attendant hysteresis and a high saturation induction so that nonlinear effects may be avoided.

(c) It should have a wide frequency response in a frequency region in which the permeability is independent of frequency.

(d) It should have low eddy current losses, good thermal conductivity, and a thermal expansion which matches that of the Hall plate.

Figure 3:
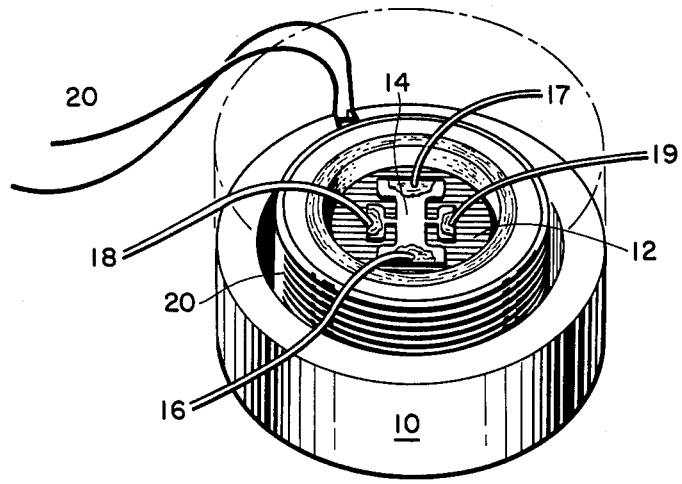
FIGURE 3 shows a Hall effect converter having contoured intermetallic semiconductor mounted on the centerpost of a ferrite cup-core and a solenoid field winding.

These considerations are best fulfilled by a ferrite material fashioned in the form of a cup-core 10 as shown in FIGURE 3; another cup-core fits over core 10 such that the center posts of each cup-core are spaced to provide a gap in which the Hall plate is mounted. If, in addition, it is required that the device have a wide bandwidth, then the Q of the inductance comprising the field winding should be kept low. The number of turns should be small since the bandwidth is inversely proportional to the copper and core losses. Also the gap spacing should be large with respect to the cross sectional area of the cup-core center post.

Thus for a wide bandwidth, the field current per unit flux change in the gap must be increased over that required for narrow band or single frequency operation.

IV. *Construction and operation of the Hall converter*

The main feature of the present invention, described herein, is the use of the large Hall effect obtainable in thin film intermetallic semiconductors with pulsed drive currents. Some of the results, suggested applications, and manufacture of Hall effect devices have been described in the aforementioned copending patent application Serial No. 150,846 filed November 7, 1961 now Patent No. 3,137,587.

FIGURE 3 shows the details of construction of the Hall effect converter of the present invention.

A ferrite cup-core 10, made up of a high permeability low loss material, has its center post 12 ground flat and reduced in thickness by about $4 \times 10^{-3}$ inches. Post 12 carries the Hall plate 14 made up, for example, of a film of polycrystalline indium antimonide of the order of 1 micron in thickness. A particular geometrical configuration of the Hall plate is shown although other shapes may be used to advantage for special purposes such as enhanced high frequency response, multiple plate configuration, etc. Terminals 16 and 17 of the Hall plate are to the drive current electrodes and terminals 18 and 19 are to the output electrodes. The Hall voltage output is obtained across terminals 18 and 19. The field winding 20 produces the magnetic field across Hall plate 14. It consists of 50 to 250 turns of No. 30 formex covered copper wire, for example, jumble wound. This was found to be adequate for frequencies up to 100 kc.s. Higher frequency response (up to 5 mcs.) is obtained by using high frequency, high permeability ferrite cores. Another cup-core 10, not shown, fits over that shown to form a complete enclosure for field winding 20 with the Hall plate 14 positioned between the posts 12.

The terminal leads are connected to the film of InSb by evaporating a thin film of gold on the contact electrodes of the Hall plate and soldering thin copper wires to these electrodes by means of a low temperature solder such as an indium tin alloy. In order to diminish inductive effects, it is desirable that Hall plate leads within the cup-core be arranged in a non-inductive relationship to each other.

Operation of the Hall converter and its use as a component of an electronic stroboscope will now be discussed with reference to FIGURE 4.

A high frequency signal is applied either directly to the field winding 20 of the converter 21 or alternatively, the field winding is the load impedance of a common emitter transistor amplifier 22, signal input amplifier, of conventional design and thus the device is capable of handling low level signals. The current in the field winding 20 produces a magnetic field H, across the Hall plate 14, this field depends linearly upon the input signal amplitude and has its identical frequency components.

Hall plate 14 is, of course, orthogonal to the magnetic field H. A current pulse of variable duration and variable pulse repetition rate is applied to the drive current electrodes 16 and 17 of the Hall plate 14 and therefore at right angles to the field. The drive current pulse polarity is of no consequence; it can be either positive or negative and can be obtained from a conventional pulse generator 25 whose output is above ground if the Hall plate output is applied to a single ended integrator amplifier 26. If amplifier 26 has a balanced input circuit, the pulse generator 25 may be grounded. Integrator-amplifier 26 will, in the simplest case, consist of an RC integrator coupled to a D.C. amplifier, alternatively an operational amplifier arranged as an integrator may also be used. The output of amplifier 26 is then applied to the Y plates of an oscilloscope or the Y input of XY-recorder 28.

Across the Hall plate terminals 18 and 19 a potential is obtained which is proportional to the product of the instantaneous value of the peak pulse amplitude and the corresponding value of the magnetic field H. The drive current pulse thus samples the field amplitude which, as stated earlier, is directly proportional to the input signal. From the arguments developed earlier, see FIGURE 1, it is readily seen that if the input frequency $f_i$, differs from the pulse repetition frequency $f_p$ by an amount $\Delta f$, the integrated Hall voltage will synthesize a replica of the input signal at a frequency $f_o = (f_i - f_p)$.

In order to obtain output frequencies of the order of 0.5 c.p.s., the strobe pulse generator 25 can generally be left free running (i.e. without use of apparatus within block 30, FIGURE 4) by first adjusting its pulse repetition frequency to that of the signal frequency, and depending on normal phase shift between the signal and strobe frequencies, to obtain the desired output. This simple method was found useful for frequencies up to 5 kcs. The signal stability remains excellent for periods of the order of ten minutes.

Improved performance may be obtained from the Hall effect stroboscope by synchronizing the input signal frequency with the pulse repetition frequency and then introducing a manual or automatic delay between the two signals so that the pulse will scan the input at a predetermined rate. This may be done by phase modulating the pulse repetition rate or by means of pulse position modulation. The apparatus in the block 30 enclosed by the dashed lines of FIGURE 4 is used for such a purpose. It operates as follows: A synchronizing signal, from signal input amplifier 22, derived from the input to be scanned, drives a sawtooth or ramp generator 32 whose repetition rate may be arbitrarily set to obtain some desired $f_o$. The signal from generator 32, applied to a voltage comparator circuit 34, is compared against a slowly changing D.C. voltage obtained across a motor driven helical potentiometer 36. When the instantaneous value of the signal from generator 32 is equal to that of the D.C. voltage from across potentiometer 36, a positive pulse is generated by the comparator 34 which, after amplification and shaping by trigger amplifier 37, is used to trigger the pulse generator 25 driving the Hall plate 14. Since the signal from generator 32 has a repetition rate much greater than that of the slowly changing D.C. voltage, from across potentiometer 36, the pulse generator 25 is triggered by a signal whose position, with respect to the input signal, slowly changes in time.

The output pulses obtained across the Hall voltage terminals 18 and 19 of Hall plate 14 are applied to integrator-amplifier 26 where an RC network with adjustable time constant, for example, integrates these pulses and provides a slowly fluctuating replica of the input voltage.

Slices of signal are summed within integrator-amplifier 26 until the charge leak-off per cycle is equal to the contributed charge arriving from the converter. Noise or other interference of a much higher frequency than that of the pulses, will not be reproduced because the net integrated charge due to them will be zero. Any other noise not disposed of in this manner will appear as a much higher frequency disturbance superposed on the lower frequency waveform of the signal. The noise attenuation can be increased by increasing the time constant of the integrator; this, however, leads to a distortion of the output signal unless the frequency difference between the pulse and signal frequency is kept small (of the order of 0.1 c.p.s.). A short time constant provides a good rise time response, useful especially for pulsed magnetic fields.

Figure 5:
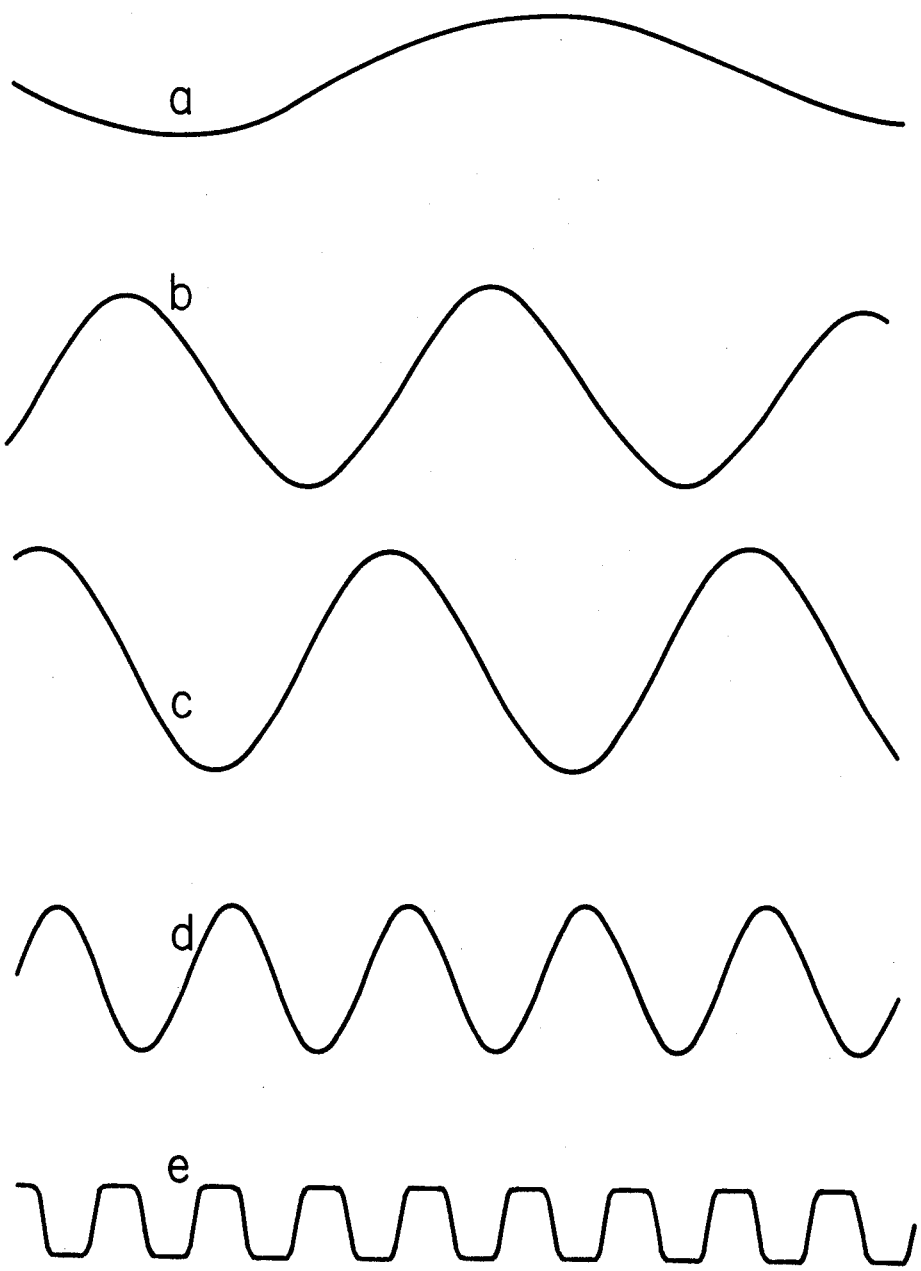
FIGURE 5 illustrates various waveforms of qualitative results obtained with a Hall effect stroboscope of the present invention.

Design criteria require, therefore, a compromise between the needed rise time, output amplitude, permissible distortion, and the desired noise reduction of the output waveform. In FIGURE 5 are shown some qualitative results obtained with a Hall effect stroboscope of the present invention. Frequency response is shown qualitatively and not to scale: $a=10^2$ c.p.s.; $b=10^3$ c.p.s.; $c=10^4$ c.p.s.; $d=10^5$ c.ps.; $e=5\times10^4$ c.p.s. square wave. The traces shown were obtained on an XY-recorder for sinusoidal currents applied to the field winding 20 in the frequency region between $10^2$ and $10^5$ c.p.s. The results also show the excellent noise rejection properties of the stroboscope as well as its ability to detect and display small, periodic magnetic field either in the presence of white noise or noise from the 60 c.p.s. line or its harmonics. Its ability to reproduce complex waveforms is illustrated in the tracking of a $5\times10^4$ c.p.s. square waveform $e$ applied to the field winding. These results do not represent the optimum attainable sensitivity, widest bandwidth, or highest attainable frequency response of a Hall effect converter. They do show, however, the advantages of such a converter for potential applications requiring flat frequency response, large input signal swings, and large signal to noise ratios for devices in which pulsed sampling techniques may be applied.

The main advantage of using a Hall effect stroboscope for the measurement of periodically varying magnetic fields is the immunity to extraneous noise, the excellent linearity of response and the high sensitivity that is obtainable with pulsed operation of thin films. Going from a bulk crystalline material to a thin film increases the effective impedance both across the drive current electrodes as well as across the Hall electrodes. In addition, the large area to volume ratio of the film improves the thermal transfer of heat generated by the passage of current through the film. It has been shown that the use of such thin films of n-type semiconductors such as InSb having a high electron mobility and a charge carrier concentration that minimizes the temperature dependence of the Hall coefficient are emminently suited as Hall effect detectors. The Hall effect stroboscope may also be used as a very low frequency generator of high precision as well as for the purpose of presenting large changes in input signal amplitude with complete fidelity provided that the input signal can be converted into a periodically varying magnetic field.

V. *Magnetometer*

The inherent simplicity of the Hall effect is an obvious advantage in its use for the detection and measurement of magnetic fields. A rectangular plate of length $x$, thickness $y$, and width $z$ is oriented along corresponding cartesian axes as shown in FIGURE 2. For a current $I_x$ and a magnetic induction $B_y$, a potential difference $V_z$ will arise in a direction orthogonal to both the electric and magnetic vectors. The proportionality between the magnetic induction and the Hall voltage $V_z$ is the basis for the magnetometer applications of the Hall effect. If the sensitivity of such a device is defined as the Hall potential per unit magnetic field ($V_z/H$), then:

$$\frac{V_z}{H}=\mu_e z\left[\frac{P_m}{y}\mu R_h\right]^{1/2} \qquad (8)$$

Equation 8 presumes that the Hall plate is embedded in a medium with an effective permeability $\mu_e$ and that $$P_m=I_x^2(\sigma z^2 y)^{-1}$$

is the peak power density per unit surface area that may be dissipated by heat conduction without materially affecting the Hall coefficient $R_h$. The electron concentration and the electron mobility $\mu$, are assumed to be much greater than the corresponding hole concentration and mobility.

As previously pointed out, materials having a high electron mobility and Hall coefficient will increase the sensitivity of Hall detectors. The intermetallic semiconductors InSb and InAs are such materials. Indium arsenide has a lower electron mobility than indium antiminide, but a much smaller temperature dependence of $R_h$. Noise effects due to the passage of current are particularly small in InSb in comparison with other semiconductors. The sensitivity of Hall detectors may be further increased by increasing their width, $z$ and decreasing their thickness, $y$. Increasing the width requires that the length of the plate be increased as well in order to avoid electrostatic shorting of the Hall electrodes, yet for many applications, it is desirable to keep a Hall probe as small as possible.

Decreasing the thickness of a Hall plate is highly desirable and suggests the use of thin films. Such films, because of their large surface to volume ratio, also dissipate heat more efficiently than Hall detectors fabricated from bulk crystalline materials. The magnetometer to be described subsequently, uses thin films of InSb, for example, evaporated onto a microscope cover glass substrate. The desired Hall plate contour is obtained either by suitable masking of the substrate or by ultrasonic cutting of the desired pattern from the glass slip.

The peak allowable power density, $P_m$, for a particular film geometry and conductivity is determined primarily by the Joule heating. Its magnitude is the steady state power dissipation in terms of the D.C. current density $J_x$. If the current is applied in the form of rectangular pulses of duration $\tau$ and repetition rate $\nu$, then for an equivalent D.C. heating effect, $J_x=J_p(\tau\nu)^{-\frac{1}{2}}$ where $J_p$ is the peak pulse amplitude. An increase in sensitivity may thus be obtained by pulse driving a Hall detector and Equation 8 should be divided by $(\tau\nu)^{\frac{1}{2}}$. A further increase in sensitivity may be obtained by placing the Hall plate between ferrite or $\mu$-metal field concentrators. The effective permeability $\mu_e$ in the gap between them is determined by the permeability and geometry of the field concentrators as well as the gap spacing.

Figure 6:
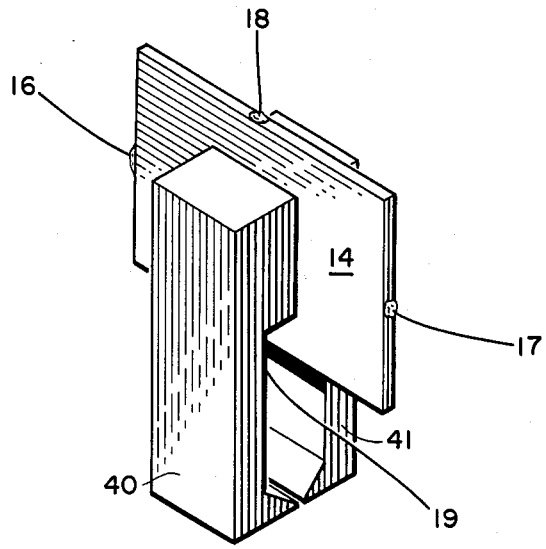
FIGURE 6 shows a Hall effect magnetometer head, wherein a Hall plate is in intimate contact with two ferrite field concentrators.

The construction of a Hall effect magnetometer head used with pulsed drive currents, is shown in FIGURE 6, and is essentially the same as the converter of FIGURE 3 with the exception of not having a field winding, since it is used to detect an unknown magnetic field. The Hall plate 14 is in intimate contact with two ferrite field concentrators 40 and 41 with a nominal permeability of 500. By way of example: The gap between the concentrators is 0.035 cm. The dimensions of the Hall plate are: $x=0.48$ cm., $y=1.6\times10^{-4}$ cm., and $z=0.24$ cm. At $+25°$ C., the conductivity of the film was determined to be $\sigma=26.6$ (ohm-cm.)$^{-1}$ and the Hall coefficient as $R_h=155.3$ cm.$^3$/coulomb. The effective mobility is then $\mu$ 2 $4.13\times10^3$ cm.$^2$ (volt-sec.)$^{-1}$. For a steady state magnetic field, identical values of $V_z$ are obtained either with a D.C. or a pulsed current drive up to a peak valve of $I=9$ ma. Above 9 ma., $V_z$ still increases linearly with the pulse current $J_p$. Joule heating affects $R_h$, however for larger D.C. currents and results in a nonlinear dependence of $V_z$ upon $I_x$. From the foregoing, the peak power density is then $P_m=0.336$ watts/cm.$^2$. Without the field concentrators $\mu=1$ and for a pulse duration and repetition rate of $\tau=10^{-7}$ sec. and $\nu=10^3$ p.p.s., the sensitivity of the pulsed Hall plate is seen to be $$(V_z/H)=8.8\times10^{-3}$$

volts/oersted. With the field concentrators 40 and 41 in place, $V_z$ was found to increase by a factor of six, therefore $\mu_e\cong6$. The effective gap permeability was found, however, to be field dependent decreasing to about 2 at a frequency of 5 megacycles.

Figure 7:
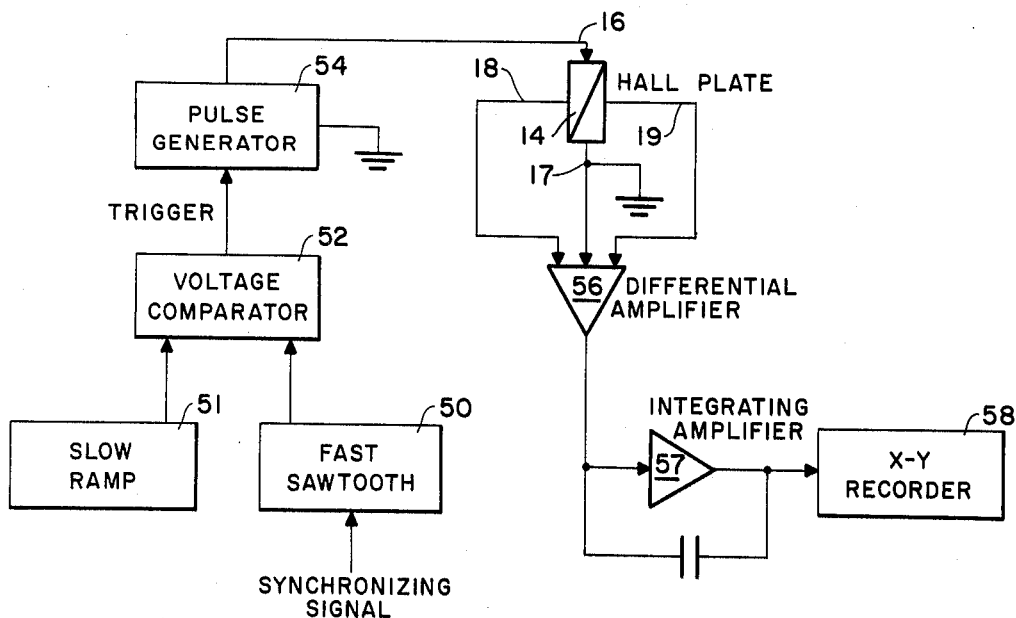
FIGURE 7 is a block diagram of a sampling magnetometer circuit of the present invention.

If the magnetic field to be measured is a periodic function of time, then a sampling method may be employed in conjunction with the Hall detector shown in FIGURE 6. The waveform as well as the amplitude and direction of a magnetic field may be determined and the usual advantages of sampling procedures may thus be realized. FIGURE 7 shows a block diagram of such a sampling magnetometer. The fast sawtooth signal, from sawtooth generator 50, synchronized to the magnetic field by any well known technique of synchronization, such as by means of a differentiating circuit, not shown, is compared against a slowly rising ramp signal from generator 51 in the voltage comparator 52. Their coincidence, e.g. the instant in time that the two voltages are equal, triggers a pulse generator 54 which is thus slowly phase modulated with respect to the signal created by the magnetic field. The current pulses from pulse generator 54 applied between leads 16 and 17, FIGS. 4 and 7, sample the magnetic field, and in turn produces a proportional Hall signal in detector 14 across 18 and 19 which is fed to differential amplifier 56. After suitable amplification of the Hall signal by differential amplifier 56 and integration by amplifier 57, a low frequency replica and synthesis of the magnetic field is obtained at the output of the magnetometer by recorder 58. Sinusoidal magnetic fields from 100 c.p.s. to $5 \times 10^6$ c.p.s. have been sampled in this fashion with an output frequency between 0.01 and 1 c.p.s. The circuits of FIGURES 4 and 7 are substantially the same, with the exception that in FIGURE 4 the magnetic field is controlled, whereas in FIGURE 7 the magnetic field is unknown and to be measured.

The maximum sensitivity of this magnetometer may be determined by considering the integrated output of the Hall detector for a train of rectangular pulses. Equation 8 may then be expressed as:

$$\frac{V_z}{H} \simeq \mu_e z \cdot \left(\frac{J_x}{J_D}\right)\left[\frac{P_m \mu R_h}{y}\right]^{1/2} \qquad (9)$$

Taking $J_p = 3J_s$ and $v = 10^6$ p.p.s., then with $\tau = 10^{-7}$ seconds and $\mu_e = 6$, Equation 9 yields $(V_z/H) - 5.6 \times 10^{-4}$ volts/oersted. If the minimum detectable signal above noise is 1 $\mu$volt then the minimum magnetic field $H_{min}$ detected by the magnetometer is $H_{min} = 1.8 \times 10^{-3}$ oersteds. Experimentally, it is found that $H_{min} = 4 \times 10^{-3}$ oersteds for a sinusoidal magnetic field of 1 kc., in fair agreement with the above calculation. This minimum was found, however, to be frequency sensitive rising to about 1 oersted at $5 \times 10^6$ c.p.s., probably because of the restricted bandwidth of the integrating amplifier. In any case, the output signal is a linear function to better than 2% of the magnetic field amplitude between $10^{-3}$ and $10^4$ oersteds. The magnetometer has been used to plot magnetic field contours in and around solenoids with and without ferrite cores and to map the steady state fringing field of an electromagnet by pulse driving the Hall detector. The magnetometer may be improved considerably by using thinner films of higher mobility InSb, designing the field concentrators for an optimum $\mu_e$ and bandwidth and improving the thermal heat transfer between the film and its surroundings.

Obviously many modifications and variations of the present invention are possible in the light of the above teachings. It is therefore to be understood that within the scope of the appended claims the invention may be practiced otherwise than as specifically described.

What is claimed is:

1. An electronic stroboscope device for reproducing the amplitude and frequency components of a magnetic field of arbitrary waveshape having frequency components up to several megacycles per second, comprising:
    (a) a Hall effect converter,
    (b) said converter comprising a thin film intermetallic semiconductor Hall detector plate which has a pair of drive current electrodes and a pair of output voltage electrodes and is mounted between a pair of stationary magnetic field cores and in intimate and direct contact therewith,
    (c) said cores acting as a path for concentrating a magnetic field of arbitrary waveshape to be measured,
    (d) means for applying a phase modulated pulse train of constant amplitude and repetition rate synchronized with said magnetic field of arbitrary waveshape connected across said drive current electrodes for synchronized stroboscopic sampling of those components of said magnetic field of arbitrary waveshape which are normal to said Hall detector plate, the Hall voltage appearing across said output voltage electrodes having components proportional to the amplitude components of said magnetic field.

2. A device for reproducing the amplitude and frequency components of a magnetic field of arbitrary waveshape, comprising:
    (a) a Hall effect converter,
    (b) said converter comprising a Hall detector plate having a pair of drive current electrodes and a pair of output voltage electrodes and mounted in direct and intimate contact between a pair of stationary magnetic field cores,
    (c) said converter being a very thin film of an intermetallic semiconductor of less than 5 microns thickness,
    (d) said cores acting as a path for concentrating a magnetic field of arbitrary waveshape to be measured,
    (e) means for applying a phase modulated pulse train of constant amplitude and repetition rate synchronized with said magnetic field of arbitrary waveshape connected across said drive current electrodes for synchronized stroboscopic sampling of those components of said magnetic field of arbitrary waveshape which are normal to said Hall detector plate, the Hall voltage appearing across said output voltage electrodes having components proportional to the amplitude components of said magnetic field.

3. An electronic stroboscope device for reproducing the amplitude and frequency components of a magnetic field of arbitrary waveshape having frequency components up to several megacycles per second, comprising:
    (a) a Hall effect converter,
    (b) said converter comprising a thin film intermetallic semiconductor Hall detector plate which has a pair of drive current electrodes and a pair of output voltage electrodes and is mounted between a pair of stationary magnetic field cores and in intimate and direct contact therewith,
    (c) said cores acting as a path for concentrating a magnetic field of arbitrary waveshape to be measured,
    (d) means for applying a phase modulated pulse train of constant amplitude and repetition rate synchonized with said magnetic field of arbitrary waveshape connected across said drive current electrodes for synchronized stroboscopic sampling of those components of said magnetic field of arbitrary waveshape which are normal to said Hall detector plate, the Hall voltage appearing across said output voltage electrodes having components proportional to the amplitude components of said magnetic field,
    (e) said means for applying a phase modulated pulse synchronized with said magnetic field of arbitrary waveshape, including a strobe pulse generator means,
    (f) means for amplification and integration of the Hall voltage output across said output voltage electrodes for reconstructing a low frequency waveform of measured magnetic field components which are normal to said Hall detector plate.

4. An electronic stroboscope device for reproducing the amplitude and frequency components of a magnetic field of arbitrary waveshape having frequency components up to several megacycles per second, comprising:
    (a) a Hall effect converter,
    (b) said converter comprising a thin film intermetallic semiconductor Hall detector plate which has a pair of drive current electrodes and a pair of output voltage electrodes and is mounted between a pair of stationary magnetic field cores and in intimate and direct contact therewith,
    (c) a field winding positioned about said field cores and said detector plate, said field winding converting electrical signals applied thereto into a magnetic field of arbitrary waveshape to be measured, (d) said cores acting as a path for concentrating the said magnetic field of arbitrary waveshape, (e) means for applying a phase modulated pulse train of constant amplitude and repetition rate synchonized with said magnetic field of arbitrary waveshape connected across said drive current electrodes for synchronized stroboscopic sampling of those components of said magnetic field of arbitrary waveshape which are normal to said Hall detector plate, the Hall voltage appearing across said output voltage electrodes having components proportional to the amplitude components of said magnetic field.

(f) a pulse generator means included in said means for applying a phase modulated pulse train which is synchronized with said magnetic field of arbitrary waveshape, (g) means for amplification and integration of the Hall voltage output across said output voltage electrodes for reconstructing a low frequency waveform of measured magnetic field components which are normal to said Hall detector plate.

References Cited by the Examiner
UNITED STATES PATENTS

| | | | |
|---|---|---|---|
| 2,907,834 | 10/1959 | Duinker | 179—100.2 |
| 2,914,728 | 11/1959 | Brophy | 324—45 |
| 2,956,209 | 10/1960 | Kuhrt | 317—6 |
| 2,978,545 | 4/1961 | Howling | 179—100.2 |
| 2,988,695 | 6/1961 | Leavitt | 324—89 |
| 2,988,707 | 6/1961 | Kuhrt et al. | 324—45 |
| 3,060,370 | 10/1962 | Varterasian | 324—45 |

OTHER REFERENCES

Grubbs, W. J.: May 1959, Bell System Tech Journal, volume 38, pages 871–873.

Shirer, D. L.: September 1960, Rev. Sci. Instr., volume 31, No. 9, pages 1000–1001.

WALTER L. CARLSON, *Primary Examiner.*